United States Patent [19]
Kashio

[11] 3,822,378
[45] July 2, 1974

[54] ADDITION-SUBTRACTION DEVICE AND MEMORY MEANS UTILIZING STOP CODES TO DESIGNATE FORM OF STORED DATA

[75] Inventor: Toshio Kashio, Tokyo, Japan

[73] Assignee: Casio Computer Co., Ltd., Tokyo, Japan

[22] Filed: Sept. 26, 1972

[21] Appl. No.: 292,403

[30] Foreign Application Priority Data

Sept. 29, 1971 Japan .............................. 46-76158

[52] U.S. Cl. .............................. 235/176, 340/172.5
[51] Int. Cl. .............................................. G06f 7/50
[58] Field of Search .................. 235/176; 340/172.5

[56] References Cited

UNITED STATES PATENTS

| | | | |
|---|---|---|---|
| 3,219,982 | 11/1965 | Tucker | 340/172.5 |
| 3,346,727 | 10/1967 | Lethin et al. | 340/172.5 X |
| 3,411,142 | 11/1968 | Lee et al. | 340/172.5 |
| 3,707,622 | 12/1972 | Hatano et al. | 235/176 |

*Primary Examiner*—Malcolm A. Morrison
*Assistant Examiner*—David H. Malzahn
*Attorney, Agent, or Firm*—Flynn & Frishauf

[57] ABSTRACT

An addition subtraction device utilized in connection with memory means, wherein the contents stored in the memory means is added to or subtracted from input data by the operation of the addition-subtraction unit, includes a shift register having a plurality of serially arranged addresses for storing information item such as words and for storing stop codes interposed between adjacent addresses. Further included is an addition-subtraction unit coupled to the input of the shift register and means for switching the operation of the addition-subtraction unit between a decimal operation for input decimal information and another form of operation for the stop codes. The addition-subtraction unit operates to convert a positive stop code into a complement stop code under the control of a borrow signal formed as a result of a subtraction operation and to convert a complement stop code into a positive stop code under the control of a carry signal formed as a result of an addition operation. Means is further provided for discriminating between the positive stop code and the complement stop code.

10 Claims, 2 Drawing Figures

ADDITION-SUBTRACTION DEVICE AND MEMORY MEANS UTILIZING STOP CODES TO DESIGNATE FORM OF STORED DATA

This invention relates to an addition-subtraction device utilizing a memory device and which is capable of discriminating between a complement and a noncomplement without idling an order of magnitude or digit of the memory device even when the word lengths of the respective addresses of the memory device are not equal.

Various types of addition-subtraction devices utilizing memory devices have been proposed in the past. For example, an addition-subtraction device is combined with a memory device such that input data is added to or subtracted from the data read out from the memory device to express the content of the memory device in terms of the result of the computation of the addition-subtraction unit. With such an addition-subtraction unit, addition operations can be made without difficulty but subtraction operations cause the following problem. For example, when [100 — 200] is computed, the result would be [999 . . . 900] which is treated as a complement. Accordingly, if this result or answer is read out and displayed with any further processing the correct answer [−100] would never be obtained. For this reason, to have a correct display of the result of the operation it is necessary to determine whether the output from the addition-subtraction unit is a complement or not and when the output is a complement it is necessary to subtract this output from [0] so as to display the correct answer together with a positive or negative sign.

According to the prior art method of discriminating between a complement and a noncomplement, the most significant digit of the output from the addition-subtraction unit is investigated to find out whether or not it is [9]. More particularly, in the prior art addition-subtraction unit a memory device has been used including memory elements having a constant word length of the respective addresses, that is using words having the same number of digits. Accordingly, with such a memory device it is not possible only to discriminate the most significant digit but also to determine whether that digit is [9] or [0]. However, when the memory device comprises a shift register, for example, wherein the word length of respective addresses is not equal, it is extremely difficult to determine the complement by the prior art method described above. Moreover, with this method of discriminating between a complement and the most significant digit it is impossible to use the address of the most significant digit as the address for memorizing data. Thus it is impossible to efficiently use a memory device of a limited number of digits.

Furthermore, in a memory device wherein a stop code is interposed between adjacent addresses it is possible to determine a complement by providing a particular digit for discriminating a complement which is related to the stop code. In this case too, as it is necessary to use a particular digit for descriminating between a complement and a noncomplement thus limiting efficient use of the memory device.

Accordingly, it is an object of this invention to provide an improved addition-subtraction unit utilizing a memory device which can discriminate between a complement and a noncomplement, thereby providing a correct answer without providing a particular digit for determining the complement even when the word length of respective addresses of the memory device are not equal and without leaving idle any digit of the memory device.

Another object of this invention is to provide an improved addition-subtraction unit with memory means of simplified construction and improved capability wherein it is possible to readily determine whether the answer of the addition-subtraction unit is a complement or not and such discrimination can be made immediately following the operation of the addition-subtraction unit.

SUMMARY OF THE INVENTION

According to this invention these and other objects can be accomplished by providing an addition-subtraction unit utilizing memory means, comprising a shift register including a plurality of serially arranged addresses for storing information items such as words, and including means for storing stop codes interposed between adjacent addresses; an addition-subtraction unit coupled to the input of the shift register; means for switching the operation of the addition-subtraction unit between a decimal operation for input decimal information and another form of operation for the stop codes; the addition-subtraction unit operating to convert a positive stop code into a complement stop code under the control of a borrow signal formed as a result of a subtraction operation and to convert a complement stop code into a positive stop code under the control of a carry signal formed as a result of an addition operation; and means for discriminating between the positive stop code and the complement stop code.

The present invention can be more fully understood from the following detailed description when taken in connection with the accompanying drawing, in which.

Figures 1, 2:
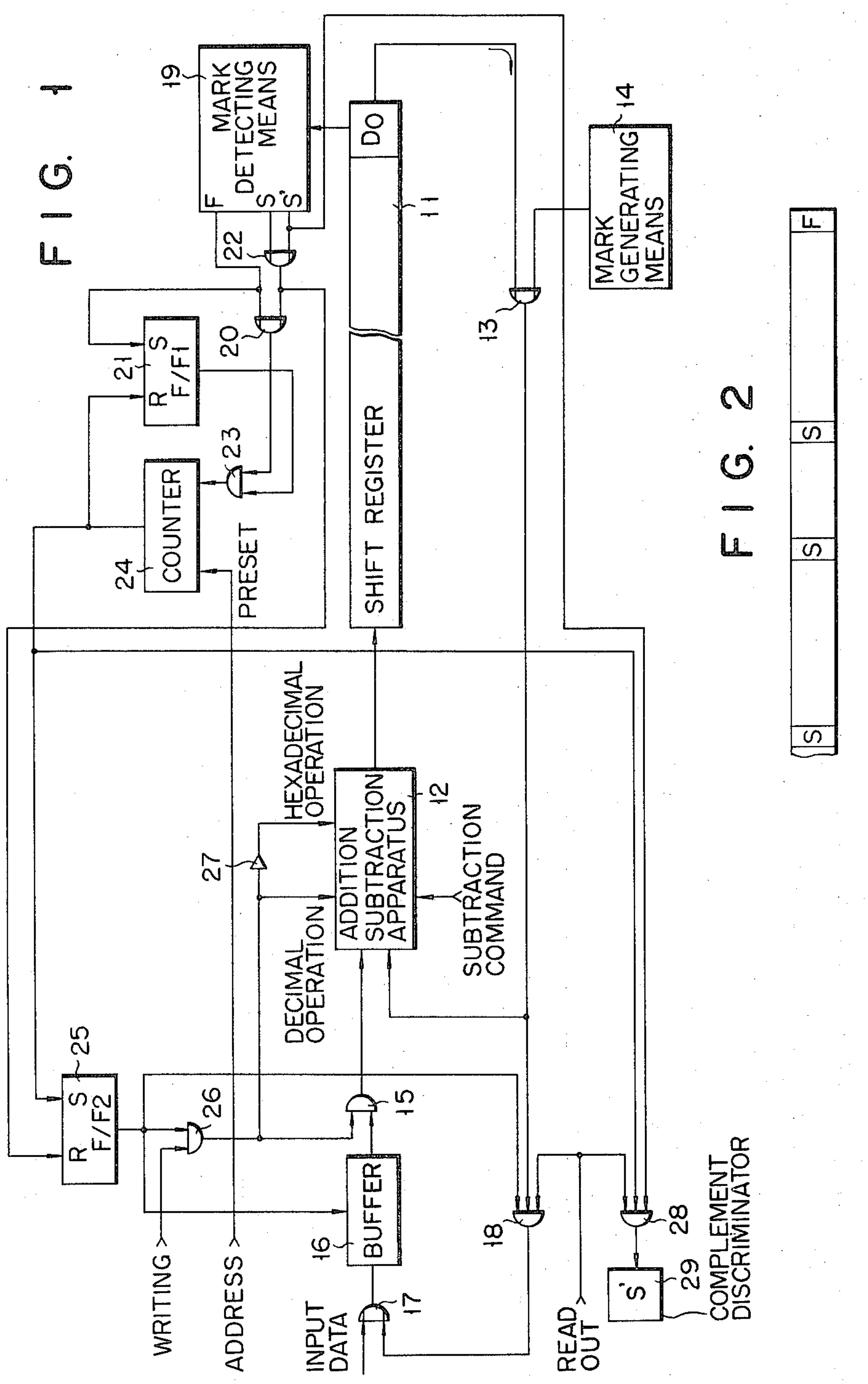
FIG. 1 is a block diagram showing one embodiment of this invention.
FIG. 2 is a diagram showing an arrangement of the addresses of the shift register shown in FIG. 1.

Referring now to the accompanying drawing, a preferred embodiment of this invention shown in FIG. 1 comprises a memory device in the form of a shift register 11 in which a plurality of words are memorized in serially arranged addresses. As shown in FIG. 2, the register includes a start code F and a plurality of serially arranged addresses which are assigned for words of the same or different length with a stop code S interposed between adjacent addresses.

On the input side of the shift register 11 is disposed an addition-subtraction unit 12 capable of performing decimal addition and subtraction operations for the data as well as hexadecimal addition and subtraction operations for binary bit codes. The addition-subtraction unit 12 is constructed to be driven by a decimal or hexadecimal command signal to perform either one of the operations. A data signal overflowed from the shift register 11 is fed back to one input of the addition-subtraction unit 12 from the output digit $D_0$ of the shift register 11 through an OR gate circuit 13. The signal from a mark generator 14 is also applied to the OR gate circuit 13. The data signal from a buffer register 16 is applied to the other input of the addition-subtraction unit 12 through an AND gate circuit 15. The input data is written in the buffer register 16 through an OR gate circuit 17. Further, the data signal from OR gate circuit 13 is also written in the buffer register 16 through an AND gate circuit 18 to write into the buffer register the content of the shift register 11.

The output digit $D_0$ of the shift register 11 is coupled to a mark detecting means 19 which detects a start code F, stop code S and a complement code S′ when these codes arrive at the output digit $D_0$ for producing an F detection signal, an S detection signal and S′ detection signal, respectively. The F detection signal is applied to an OR gate circuit 20 and to a first flip-flop circuit 21 as a set signal. The S and S′ detection signals are applied to an OR gate circuit 20 via the OR gate circuit 22. The output from the OR gate circuit 20 is supplied to an AND gate circuit 23 together with the output from the first flip-flop circuit 21 and the output from the AND gate circuit 23 is applied to a counter 24 as a count down signal. The counter 24 is preset by an address designation signal to a count corresponding to a designated address. The counter 24 produces an output signal when its count becomes "0" for resetting the first flip-flop circuit 21 and for setting a second flip-flop circuit 25 which is connected to be reset by the output signal from the OR gate circuit 22. The second flip-flop circuit 25 is set to supply its output signal to an AND gate circuit 26 together with a write command signal. The output signal from the AND gate circuit 26 is applied to one input of the AND gate circuit 15 as a gate signal and to the addition-subtraction unit 12 as a decimal operation set signal. The output from the AND gate circuit 26 is also supplied to the addition-subtraction unit 12 via a NOT circuit 27 to act as a hexadecimal operation set signal. The output produced by the second flip-flop circuit 25 when it is set is applied to the buffer register 16 as a shift command signal and to the AND gate circuit 18 together with a read command signal to act as the gate signal. Further, the read out command signal is applied to AND gate circuit 28 together with the output signal from counter 14 and the S′ detection signal of the mark detector 19 and the output from AND gate circuit 28 is supplied to a complement discriminator 29 as a complement discriminating signal.

The apparatus described above operates as follows: The mark generator 14 supplies a signal to the shift register 11 through OR gate circuit 13, and addition and subtraction apparatus 12 to write a start code mark F and stop codes S in the shift register by setting the word lengths of respective addresses shown in FIG. 2. Thus for example, where it is necessary to write a data [365] in the third address, an information item corresponding to [356] is supplied to the buffer register 16 as input data so as to write this data in the buffer register. Concurrently therewith [3] is designated as an address designation signal and this signal is supplied to counter 24 to set the count therein to [3]. Then a write command signal is applied to AND gate circuit 26. Under these conditions the content of the shift register 11 is progressively shifted and when the start code F reaches the output digit $D_0$, mark detector 19 detects this to produce an F detection signal. In response to this signal flip-flop circuit 21 is set to produce an output signal "1" which is applied to AND gate circuit 23 as a gate signal thereby counting down counter 24 each time an S detection signal or an S′ detection signal is generated following the detection of the F detection signal. In other words, the count of the counter 24 is reduced to "0" when the leading end of the content at the third address of the shift register 11 reaches the output digit $D_0$, thereby resetting flip-flop circuit 21 and setting flip-flop circuit 25. This enables AND gate circuit 26 to apply a read out command signal to AND gate circuit 15 for applying a shift command signal to the buffer register 16 so as to write the data [356] in the third address of the shift register through the addition-subtraction unit 12. The flip-flop circuit 25 is reset by the next S detection signal thus completing the writing.

Where it is desired to add [123], for example, to the data [356] which has been written in the third address in this manner, in the same manner as in the case of writing, the data [123] is written in the buffer register 16 and counter 24 is set to count [3] by the address designation signal. Then, a write command signal is applied and when the content stored in the third address of the shift register 11 reaches the output digit $D_0$ to be transferred to the addition-subtraction unit 12, the flip-flop circuit 25 is set so that the data [123] in the buffer register is applied to the addition-subtraction unit 12 together with the data [356] overflowed from the shift register 11. Under these conditions the addition-subtraction unit 12 is set to perform decimal operation by the output signal from AND gate circuit 26 which is produced by the setting of the flip-flop circuit 25, thereby performing an operation of $356 + 123 = 479$ to rewrite the content in the third address of the shift register 11 to [479]. Thereafter, the flip-flop circuit 25 is reset by a detection signal of a stop code S which is interposed between the third address and the next address, thus completing the addition operation.

Let us now consider the subtraction operation. For example, to subtract [300] from [479] stored in the third address, that is to perform an operation [$479 - 300 = 179$] the buffer register 16 and the shift register 11 are set in the same manner as above described and a subtraction command signal is applied to the addition-subtraction unit 12. However, when calculating [$479 - 500$], the addition-subtraction unit 12 will produce an answer "999 – 979," that is a complement. As a result, a value $479 - 500 = -21$ will not be stored in the shift register 11.

In such an operation a borrow process must be used wherein [1] is borrowed from a digit of one order above. As a result, all digits in the upper orders of the word at the third address are changed to [9] and when the most significant digit is changed to "9" a borrow signal is produced at which time a stop code S arrives at the output digit $D_0$ of the shift register 11. The S detection signal produced in response to this stop code S resets the flip-flop circuit 25, thus applying a transfer signal to the addition-subtraction unit 12 through a NOT gate circuit 27 which switches the operation of the addition-subtraction unit 12 from the decimal operation to the hexadecimal operation.

Accordingly, when the stop code S is constituted by a binary four bit signal "1111" this signal is subjected to the hexadecimal operation under the control of a borrow signal from the most significant digit of the word. Thus, the S code "1111" is converted into an S′ code "1110." For this reason, in spite of the fact that a data item "999 . . . 979" is stored in the shift register 11 it can be determined that the stored data is a complement since the stop code corresponding to said data has been converted into an S′ code "1110."

The complement does not raise any problem while it is stored in the shift register. If, however, the complement is read out (for indication) only in a state just as stored, that is, in the form of "999 . . . 979," it will be impossible to determine whether said read out number is a complement or not.

To read out such data, the third address which is to be read out is designated and a read out command signal is applied. By this address designation, counter 24 is preset to "3" with the result that when the data of the third address appears at the output digit $D_0$ of the shift register 11, the flip-flop circuit 25 is set to enable AND gate circuit 18 in the same manner as in the case of writing. Enabling of the AND gate circuit 18 drives the buffer register 16 and the data "999 . . . 979" which has been stored in the shift register 11 and now overflowed through its output digit $D_0$ is written in the buffer register 16 through OR gate circuit 17. When the writing of this data is completed and when a complement code S′ is detected at the output digit $D_0$ of the shift register 11, flip-flop circuit 25 is reset to terminate the input to the buffer register 16 and a signal is applied to AND gate circuit 28. Since this AND gate circuit has been enabled by a signal produced when the count of counter 24 is reduced to "0" (produced when the designated address is reached) and a read out command signal it will apply a complement detection signal to the complement discriminator 29 thereby displaying that the data read out from the buffer register 16 is a complement.

When the data stored in the buffer register 16 is displayed as it is, the complement discriminator 29 shows that the displayed data is a complement.

By utilizing the output signal from the complement discriminator and the data stored in the buffer register 16, an operation (000 . . . 000 − 999 . . . 979 = − 21)

is carried out thereby displaying a correct answer " − 21." Alternatively, this complement code may be stored in the buffer register together with the read out data.

Where the data stored in the shift register 11 is not a complement, no complement code S′ is detected so that no discrimination output is produced by the complement discriminator 29. Accordingly, the data stored in the buffer register 16 will be displayed directly as a correct answer.

Let us consider an operation wherein an addition is made to a complement data which has been stored as above described. More particularly when "10" is added to the data "999 . . . 979" stored in the third address the answer of the addition-subtraction unit 12 becomes "999 . . . 989," that is a correct complement and will be stored in the shift register 11 as it is. However, when adding "32" to a complement "999 . . . 979" all upper digits 9 will be rendered "0" by the carry signals from the lower digits and the addition-subtraction unit 12 will produce a correct answer "11" which is stored in the shift register 11. In this case when a complement code S′ reaches the addition-subtraction unit 12, this unit is switched for the hexadecimal operation whereby [1] is added to the S′ code [1110] by the action of the carry signal thus converting the S′ code into an S code [1111]. Thus, the stop code S is modified such that the content of the shift register 11 is not a complement but a correct answer.

As above described, this invention provides an addition-subtraction unit capable of discriminating whether the stored data is a complement or not dependent upon whether the codes corresponding to serially stored addresses are an S code, or an S′ code thereby displaying a correct answer independent of the length of the word stored. Especially, as the complement is displayed without utilizing a portion of the word stored as has been the prior practice and as the connection between codes S and S′ is performed by the addition-subtraction unit immediately following to the addition or subtraction operation, it is possible to greatly simplify the construction and to improve the capability of the addition-subtraction unit.

What is claimed is:

1. An addition-subtraction device utilizing memory means, comprising:

a shift register including a plurality of serially arranged information addresses for storing data items, and including means for storing stop codes interposed between adjacent addresses;

an addition-subtraction unit coupled to the input of said shift register, said addition-subtraction unit operating to effect the addition and subtraction of the contents of addresses and said stop code of the shift register, to convert a positive stop code into a complement stop code under control of a borrow signal formed as a result of a subtraction operation and to convert a complement stop code into a positive stop code under control of a carry signal formed as a result of an addition operation;

means responsive to at least an output of said shift register for supplying a switching output to switch the operation of said addition-subtraction unit between a decimal operation for input decimal information and another form of operation for said stop codes; and means coupled to at least said means for supplying a switching output for discriminating between said positive stop code and said complement stop code.

2. The addition-subtraction device utilizing memory means according to claim 1 wherein said stop codes and input data are in the form of binary bit codes and the operation of said addition-subtraction unit is switched between a decimal operation and a hexadecimal operation.

3. The addition-subtraction device utilizing memory means according to claim 1 including a mark generator coupled to said addition-subtraction unit for writing in said shift register a start code mark and the stop codes through said addition-subtraction unit.

4. The addition-subtraction device utilizing memory means according to claim 1 wherein said data items have different lengths.

5. The addition-subtraction device utilizing memory means according to claim 1 wherein said data items have the same length.

6. The addition-subtraction device utilizing memory means according to claim 1 wherein there are provided a buffer register coupled to said addition-subtraction unit for temporarily storing data items; and means to feed outputs from said shift register into said buffer register; and wherein said means for supplying a switching output includes a counter for detecting the addresses of said shift register, means to set said counter to a predetermined count corresponding to a predetermined address of said shift register in which the input data is to be stored, means responsive to an output of said shift register to enable said counter to count down said predetermined count to a second predetermined count in response to the shifting operation of said shift register, and means responsive to said second predetermined count of said counter to shift the contents of said buffer register so as to write data in said predetermined address of said shift register.

7. The addition-subtraction device utilizing memory means according to claim 6 wherein an output of said shift register is coupled to an input of said addition-subtraction unit, and which further includes means to write in said buffer register additional input data which is to be added to or subtracted from said input data stored in said shift register so as to apply said additional input data to said addition-subtraction unit together with said input data shifted out from said shift register.

8. The addition-subtraction device utilizing memory means according to claim 6 wherein said second predetermined count is zero.

9. An addition-subtraction device utilizing memory means, comprising:

a shift register including a plurality of serially arranged addresses for storing data items, and including means for storing stop codes interposed between adjacent addresses, a buffer register for temporarily storing input data;

means to write input data in said buffer register;

an addition-subtraction unit coupled to the input of said shift register and to the output of said buffer register for selectively performing addition and subtraction operations on the contents of addresses and said stop code of said shift register and on said input data, said addition-subtraction unit being further coupled to an output of said shift register, a mark generator coupled to said addition-subtraction unit and adapted to selectively generate a start mark F and said stop codes S which are written in said shift register through said addition-subtraction unit;

a counter coupled to said shift register for detecting the addresses of said shift register;

means to set said counter to a predetermined count corresponding to a predetermined address of said shift register in which input data is to be stored;

means to apply the data shifted out from said shift register to said buffer register;

a mark detector responsive to the output from said shift register for producing an F detection signal an S detection signal and S′ detection signal corresponding to said start code F, said stop code S and a complement stop code S′, respectively;

a first flip-flop circuit which is coupled to said mark detector and to said counter so as to be set by said F detection signal and reset by the output from said counter;

means to apply the output from said first flip-flop circuit to said counter to enable said counter to count down from said predetermined count to zero in response to said F detection signal, said S detection signal and said S′ detection signal;

a second flip-flop circuit which is coupled to said mark detector and to said counter so as to be set by the zero value output from said counter and reset in response to said S detection signal and said S′ detection signal;

means responsive to the output of said second flip-flop circuit to shift the input data in said buffer register;

means for applying said shifted input data to said addition-subtraction unit from said buffer register such that said input data is added to or subtracted from said input data stored in said shift register;

means including said flip-flop circuit and said counter and being responsive to said stop code for switching the operation of said addition-subtraction unit between a decimal operation and a hexadecimal operation for data to be stored in said shift register, whereby said addition-subtraction unit operates to convert a positive stop code into a complement stop code under the control of a borrow signal formed as a result of a subtraction operation and to convert a complement stop code into a positive stop code under the control of a carrier signal formed as a result of an addition operation; and means coupled to at least said switching means for discriminating between said positive stop code and said complement stop code, both codes being generated as a function of the switching operation of said switching means and being stored in said shift register.

10. An addition-subtraction device according to claim 9 wherein said last mentioned means is supplied with said S′ detection code from said mark detector and the output from said counter.

* * * * *